(12) United States Patent
Eriksson

(10) Patent No.: US 8,523,187 B2
(45) Date of Patent: Sep. 3, 2013

(54) AXIAL FACE SEAL ASSEMBLY, MOUNTING METHOD AND MOUNTING FIXTURE

(75) Inventor: Sivert Eriksson, Saltsjö-Boo (SE)

(73) Assignee: Xylem IP Holdings LLC, White Plains, NY (US)

( * ) Notice: Subject to any disclaimer, the term of this patent is extended or adjusted under 35 U.S.C. 154(b) by 476 days.

(21) Appl. No.: 12/921,837

(22) PCT Filed: Mar. 12, 2009

(86) PCT No.: PCT/SE2009/000132
§ 371 (c)(1),
(2), (4) Date: Dec. 3, 2010

(87) PCT Pub. No.: WO2009/113942
PCT Pub. Date: Sep. 17, 2009

(65) Prior Publication Data
US 2011/0121514 A1 May 26, 2011

(30) Foreign Application Priority Data
Mar. 13, 2008 (SE) ..................................... 0800583

(51) Int. Cl.
*F16J 15/34* (2006.01)
(52) U.S. Cl.
USPC ............ 277/370; 277/371; 277/375; 277/390
(58) Field of Classification Search
USPC .................................. 277/370–373, 375, 390
See application file for complete search history.

(56) References Cited

U.S. PATENT DOCUMENTS

| RE24,536 | E | * | 9/1958 | Dolhun | 277/372 |
|---|---|---|---|---|---|
| 3,508,767 | A | * | 4/1970 | Cooke et al. | 285/95 |
| 3,672,689 | A | * | 6/1972 | Hadley | 277/373 |
| 3,689,083 | A | * | 9/1972 | Greenwalt | 277/372 |
| 4,786,061 | A | * | 11/1988 | Buchalla | 277/408 |
| 5,558,343 | A | | 9/1996 | Aparicio, Jr. | |
| 6,364,605 | B1 | | 4/2002 | Lutes | |
| 6,568,686 | B2 | * | 5/2003 | Hadley | 277/370 |
| 2006/0061041 | A1 | | 3/2006 | Huang | |

* cited by examiner

Primary Examiner — Vishal Patel
(74) Attorney, Agent, or Firm — RatnerPrestia

(57) ABSTRACT

An axial face seal assembly including a seal member which is seated in a carrier, the carrier being non-rotatably connected to a base member but movable axially thereto and biased from the base member by means of a compression spring interposed between the base member and the carrier, the base member being axially and non-rotatably securable to a drive shaft by means of an open ring clamp having first end second ends. The ring clamp is supported on the base member, at least one of said first and second ends being movable relative to the other end in a circumferential direction; and wherein tightening means is rotatably journalled on the base member for adjusting the relative distance between the first and second ends of the ring clamp. A mounting fixture is likewise disclosed and cooperating with the seal assembly in a mounting procedure.

12 Claims, 2 Drawing Sheets

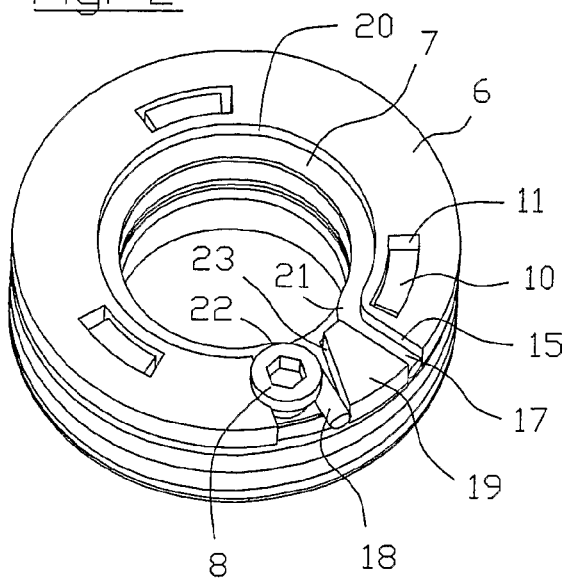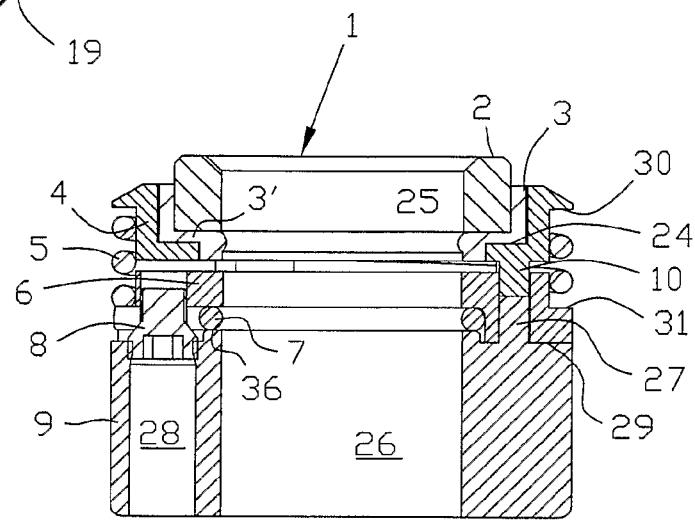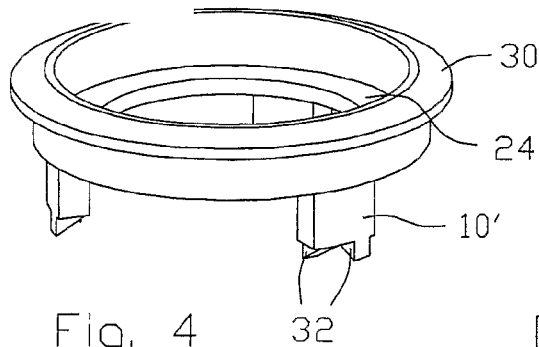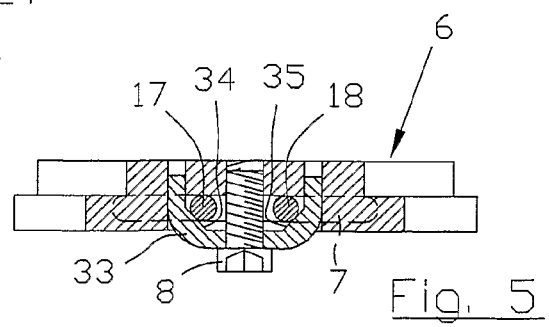

AXIAL FACE SEAL ASSEMBLY, MOUNTING METHOD AND MOUNTING FIXTURE

This application is the U.S. national phase application of PCT International Application No. PCT/SE2009/000132, filed Mar. 12, 2009, which claims priority to Swedish Patent Application No. 0800583-7, filed Mar. 13, 2008, the contents of such applications being incorporated by reference herein.

TECHNICAL FIELD OF THE INVENTION

The invention relates to a seal assembly which is arranged for co-rotation with a drive shaft in a rotary machine, and which effects sealing of the passage of a drive shaft through a housing wall in the rotary machine. The invention also relates to a mounting fixture and a method by which the novel seal assembly is mountable on a drive shaft in a rotary machine.

BACKGROUND AND PRIOR ART

The invention is useful for sealing the passage of a drive shaft from a motor compartment to a hydraulic unit in submersible pumps and mixers, e.g., albeit other use is conceivable. The submersible pumps and mixers typically comprise an electrically driven motor and a hydraulic unit comprising an impeller/propeller connected to the motor via a rotary shaft. In order to prevent medium in the hydraulic unit from entering the motor along the shaft, seal devices are arranged between the hydraulic unit and the motor. A common type of seal device is a mechanical seal comprising a seal ring rotating with the shaft and sealing against a stationary seal ring which is attached to a housing wall forming part of the motor compartment. The two seal rings are pressed towards each other by spring force to prevent medium from entering the sealing interface.

In submersible pumps, e.g., a set of two seal assemblies are often installed to provide sealing interfaces at the passages of a drive shaft reaching through a fluid filled housing portion which defines a barrier for pumped medium, between the motor and the hydraulic unit.

The seal assemblies which are referred to generally comprise a ring-shaped, axial face seal member presenting a sealing end face, which is biased towards the stationary seal ring on the housing wall by means of a spring. The spring is supported from a supporting member that is non-rotatably connectable to the drive shaft, and at an axially fixed position which sets the seal member under bias from the spring. The seal and supporting members are likewise non-rotatably connected, and so the seal assembly is supported on the drive shaft for co-rotation therewith, and in concentric relation with the drive shaft.

Since the sealing faces are subject to wear, ease of mounting and dismounting is an important feature in an axial face seal assembly. In many rotary machines the space available about the drive shaft is however limited, and replacement of the seal assembly requires in most designs that the machine housing is opened. For ease of mounting and replacement there is thus a need for a seal assembly which can be axially and non-rotatably secured to the drive shaft in mounting and dismounting procedures requiring axial access only to the seal assembly.

To this purpose, Lutes has disclosed in U.S. Pat. No. 6,364,605 a turbine pump wherein a carrier member for an axial face seal is non-rotatably secured to the drive shaft by means of a drive pin. The drive pin reaches in radial direction from the carrier member into an axially extended key-groove running in the surface of the drive shaft, the key groove also cooperating with a key for securing an impeller in the drive shaft's end. A snap-ring which is insertable in a snap-ring groove on the drive shaft secures the carrier member axially on the drive shaft. As the seal assembly is inserted on the drive shaft, the drive pin travels in the key-groove which mouths in the end of the drive shaft. The snap-ring is then pushed axially over the drive shaft to be seated in the snap-ring groove, under compression of the seal assembly.

Although Lutes' solution meets the stated object well, the structure requires dedicated and accurate machining of the drive shaft in order to fit a specific seal assembly.

In U.S. Pat. No. 5,558,343 Aparicio discloses an axial face seal assembly in a water pump wherein an impeller is connectable to the end of a drive shaft. The seal assembly comprises, in consecutive order, a wear disc presenting a sealing end face, an annular seal member supported in a carrier which is arranged to slide on the drive shaft, a compression spring urging the carrier, the seal member and the wear disc away from a base member which is axially and non-rotatably securable to the impeller, and thus relative to the drive shaft. In its bottom end facing away from the carrier, the base member is formed with a radial flange which is supported axially from the back of the impeller. A stop pin rises from the impeller's back to engage a tab in an annular channel formed in the flange of the base member, the stop pin securing the base member non-rotatably to the impeller. The base member and the carrier are non-rotatably engaged by means of interlocking radial protrusions and openings which are formed in the cylinder walls of the two elements, and which permit an axial relative motion between the two.

Albeit Aparicio's solution meets the object of a mounting procedure requiring axial access only, the structure inconveniently falls out of the housing if the impeller was to be dismounted for replacement. In U.S. Pat. No. 5,558,343 this is no problem, since the seal assembly is intended to remain mounted for the service life of the pump itself.

SUMMARY OF THE INVENTION

An object of the present invention is to provide an axial face seal assembly arranged for co-rotation with a drive shaft in a rotary machine, and which is structured to require axial access only in mounting and dismounting procedures.

Another object of the present invention is to provide an axial face seal assembly which is securable axially and non-rotatably to a drive shaft in a rotary machine, and which is structured to avoid machining of the drive shaft in order to locate the seal assembly on the drive shaft.

Yet another object of the present invention is to provide an axial face seal assembly adapted for a mounting procedure by which a proper axial bias of a seal member can be ensured on a continuous drive shaft surface.

Still another object of the present invention is to provide an axial face seal assembly adapted for a mounting procedure by which a proper axial bias of a seal member can be ensured on a continuous drive shaft surface by means of a mounting fixture.

The objects of invention are achieved through the axial face seal assembly, the mounting method, and through the mounting fixture, as defined in appended claims.

Briefly, an axial face seal assembly for co-rotation with a drive shaft in a rotary machine is disclosed, comprising in axial succession at least the following components: a seal member, a carrier and a base member, all of which are shaped for mounting in concentric relation with a drive shaft. In the seal assembly, the seal member is seated in the carrier to present a sealing end face, and the carrier is non-rotatably connected to the base member. The carrier is movable relative to the base member in axial direction, and biased away from the base member by means of a compression spring which is interposed between the base member and the carrier. According to the invention, the base member is axially and non-rotatably securable to a drive shaft by means of an open ring clamp having first end second ends. Characterizing features of the invention are that the ring clamp is supported on the base member; at least one of said first and second ends being movable relative to the other end in a circumferential direction; and tightening means is rotatably journalled on the base member for adjusting the relative distance between the first and second ends of the ring clamp.

Arranging a ring clamp to be housed in the inner periphery of the base member, in combination with a tightening means arranged for reducing the circumferential dimension of the ring clamp as disclosed, effects a frictional arresting of the seal assembly at an arbitrary location of a drive shaft having a continuous outer surface. This way, additional machining of the drive shaft in order to locate the seal assembly on the drive shaft can be avoided. The continuous surface is of course not a prerequisite, and the ring clamp may alternatively cooperate with a formation made on the drive shaft, if appropriate.

The tightening means is preferably arranged in a bottom end of the base member, i.e. the end which is opposite a top end that faces towards the carrier.

This embodiment secures the option of arranging the seal assembly for mounting/dismounting in procedures that require only axial access to the seal assembly.

In a preferred embodiment, the ring clamp is supported near the inner periphery of the bottom end of the base member. A first end of the ring clamp is firmly seated in a clamp seat formed in the bottom end of the base member, whereas a second end of the ring clamp is located in a neighbouring clamp seat and movable in the circumferential direction by the tightening means which engages the second end of the ring clamp in the neighbouring clamp seat.

Likewise in a preferred embodiment the tightening means comprises an adjusting screw which is rotatably journalled in the base member so as to be engaged by a tightening tool that is insertable in a direction parallel with the longitudinal axis of the seal assembly.

The adjusting screw may be arranged for circumferential compression of the ring clamp about the drive shaft by directly engaging the movable end of the ring clamp. To this purpose, the adjusting screw advantageously comprises a frusto-conical portion the end of which having the greater radius is facing away from the base member. The frusto-conical portion engages an inner side of a knee, connecting a circular portion of the ring clamp to the ring clamp end which is formed to turn about the frusto-conical portion of the adjusting screw.

Alternatively, the frusto-conical portion may be provided through a separate conical sleeve which is rotatably journalled on the adjusting screw.

Another alternative foresees a tightening means comprising an adjusting screw which indirectly engages the first and second ends of the ring clamp via a C-shaped clamp that is driven by the adjusting screw for a guided movement in the base member.

It is preferred that the carrier is non-rotatably connectable to the base member by means of at least one dowel projecting from the bottom end of the carrier and insertable into a corresponding dowel-hole mouthing in both ends of the base member. This embodiment facilitates interaction with a mounting fixture used in a mounting procedure which ensures that a proper axial compression of the spring member, which is interposed between the base member and the carrier, can always be set upon mounting.

A mounting fixture, adapted for use in a procedure for mounting the axial face seal assembly in co-rotating relation with a drive shaft in a rotary machine, comprises a body having top and bottom ends, and a first through-hole the radius of which is adapted for insertion of the fixture onto the subject drive shaft. The top end of the body is arranged for locating the seal assembly components on the fixture. A second through-hole through the body is positioned so as to be aligned with the tightening means when the seal assembly is located on the fixture, said second through-hole being adapted for insertion of a tightening tool from the bottom end of the body. The top end of the fixture body is arranged to support in mutual relation the base member and the carrier at a predetermined axial distance.

The fixture is formed with at least one projection rising from the top end of the fixture body, in opposite relation to the dowel projecting from the bottom of the carrier. The projection supports the carrier at an axial distance from the base member when the seal assembly is located on the fixture, the axial lengths of the projection and the dowel in cooperation determining said axial distance. The projection in the top end of the fixture body can be realized as a dowel projecting into the dowel-hole through the base member when the seal assembly is located on the fixture.

Mounting of the axial face seal assembly by assistance from the mounting fixture is accomplished through the following steps:
assembling the seal assembly components on a fixture arranged for locating in consecutive order the base member with ring clamp and tightening means, the compression spring, the carrier, and the seal member;
inserting the fixture and seal assembly together on the drive shaft until the seal member abuts an opposite seal surface arranged stationary on the rotary machine;
compressing the seal assembly against the force of the compression spring to a predetermined extent which is set by the fixture, and
tightening the ring clamp before removing the fixture.

SHORT DESCRIPTION OF THE DRAWINGS

The invention will be more closely explained below and with reference to the accompanying schematic drawings. In the drawings, FIG. 1 shows the seal assembly components and a mounting fixture in exploded view;

FIG. 2 shows the assembled components of the seal assembly in a bottom perspective view;

FIG. 3 is a longitudinal section through the seal assembly, in interacting engagement with the mounting fixture;

FIG. 4 shows a modified embodiment of a carrier member included in the seal assembly, and FIG. 5 is a partial section along a chord line through the seal assembly, illustrating schematically a modified means for tightening a ring clamp included in the seal assembly.

DETAILED DESCRIPTION OF A PREFERRED EMBODIMENT OF THE INVENTION

Figure 1:
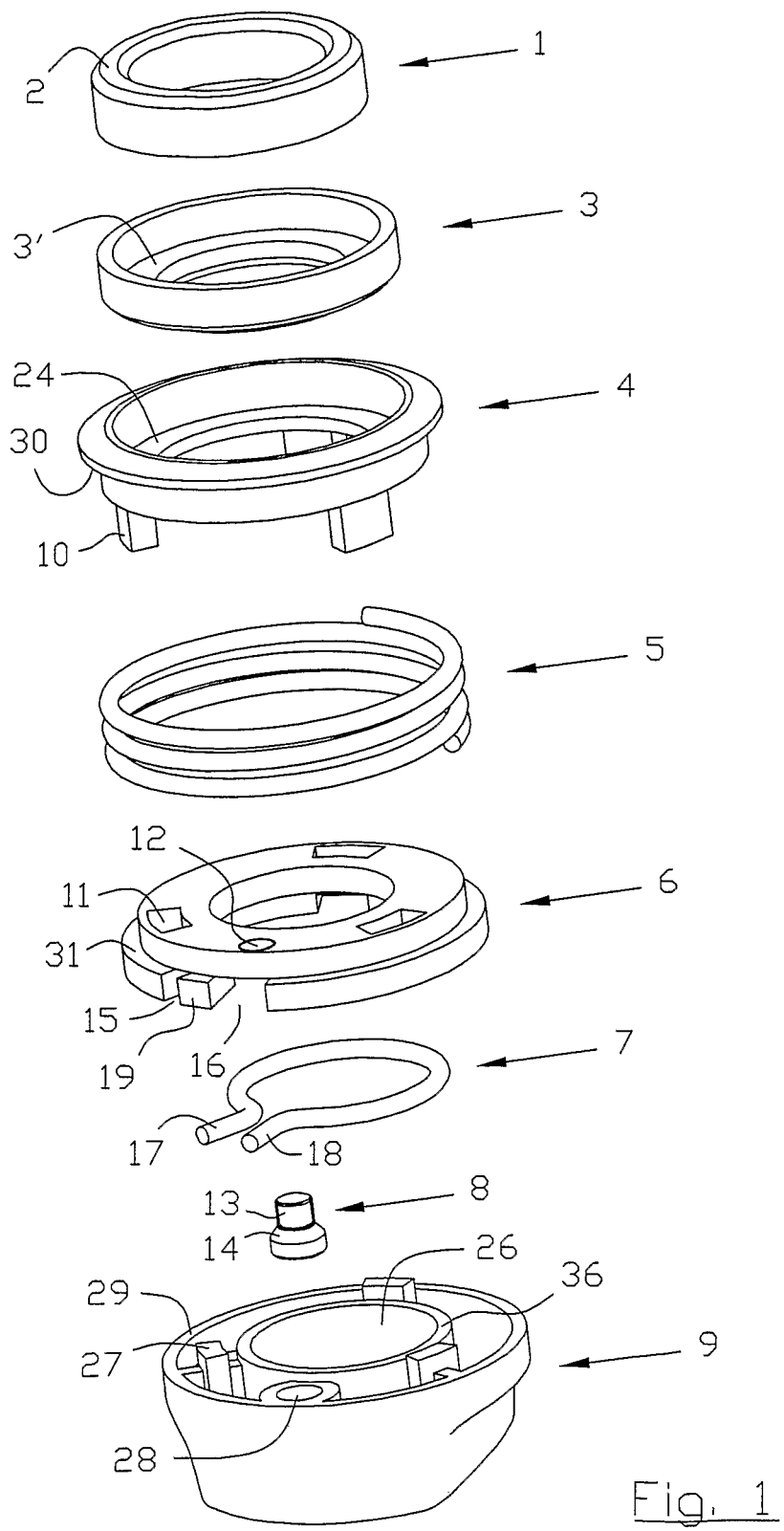

The essential components comprised in the axial face seal assembly are illustrated in exploded view in FIG. 1. The components are shown in consecutive order from top to bottom of the drawing, the illustrated relative positions of components explaining any reference made herein to top and bottom ends of the components.

From the top of the drawing, the seal assembly comprises an annular seal member 1 presenting a sealing end face 2 in its top end. Reference numeral 3 indicates an annular seal element made of elastomer material, the elastomer seal 3 adapted to be interposed between the seal member 1 and a carrier 4. A compression spring 5 is interposed between an annular base member 6 and the carrier 4, the compression spring exerting an axial force that applies a bias to the carrier and seal members in the axial direction. The base member 6 is axially and non-rotatably securable to the drive shaft by means of an open ring clamp 7, which is arranged to be housed in the inner periphery of the base member 6 (as is best understood from FIG. 2.) The ring clamp 7 is compressible in the circumferential direction by means of an adjusting screw 8 which is rotatably journalled in the base member 6. Reference numeral 9 indicates a mounting fixture to be further explained below.

Returning to the carrier 4, a dowel 10 is arranged to project from the bottom end of the carrier. Preferably, three dowels 10 project equidistantly spaced as disclosed. The dowels 10 are dimensioned for insertion in corresponding dowel-holes 11 mouthing in the top and bottom ends of the base member 6 (see the dowels inserted in FIG. 2). In result of the dowels engaging the dowel-holes the carrier 4 is non-rotatably connected to the base member 6, but movable relative thereto in the axial direction. The base member 6 further comprises a hole 12 arranged for threaded engagement with a threaded portion 13 on the adjusting screw 8. The threaded portion 13 adjoins a frusto-conical portion 14, the operation of which will be further explained below. First and second seats 15 and 16, respectively, are formed in the bottom end of the base member 6 and arranged to receive first and second ends 17 and 18, respectively, of the ring clamp 7. The seats 15, 16 are separated through an intermediate base member section 19 acting as a counter-support 19 for a movable end of the ring clamp.

The assembled components of the seal assembly are illustrated in the bottom perspective view of FIG. 2. The drawing shows the dowels 10 occupying the dowel-holes 11 going through the base member 6. The ring clamp 7 is here received in an annular recess 20 formed in the inner periphery of the bottom end of the base member. The ring clamp 7 need however not be accommodated in the base member 6 as provided through the annular recess 20. The ring clamp may alternatively be carried in the bottom end of the base member by support from the adjusting screw 8, engaging one end of the ring clamp, and a projecting counter support engaging the other end of the ring clamp. The ring clamp may also alternatively be seated deeper into the base member then being disclosed in FIG. 2, requiring of course a corresponding arrangement of the lightening means or adjusting screw.

It will be realized that the ring clamp 7 has an inner diameter which is equal or larger than an inner diameter of the annular base member 6 in the un-tightened condition of the ring clamp. It is equally realized that the ring clamp 7 may be compressed, i.e. when separate from the drive shaft, to an inner diameter which is less then the outer diameter of the drive shaft.

The first end 17 adjoins a circular portion of the ring clamp via a knee formation 21, from where the first end extends in radial direction to be firmly seated in the seat 15. The second end 18 extends correspondingly from a knee 22 connecting the second end with the circular portion of the ring clamp. The second end 18 is received movable in the neighbouring seat 16, which is separated from the first seat 15 through the intermediate base member section 19. The adjustment screw 8 is rotatably journalled in the neighbouring seat 16, such that the frusto-conical portion 14 operatively engages an inner side of the knee 22 in a sliding contact. When the adjusting screw 8 is rotated deeper into the base member 6, the frusto-conical portion urges the second end 18 towards the first end of the ring clamp. In result of an angular relief 23 formed on the counter-support 19, the knee 22 in the second end 18 is allowed to move in the circumferential direction of the ring clamp, reducing the diameter of the ring clamp for a frictional clamping about the circumference of the drive shaft. This way, the base member 6 is non-rotatably and axially arrested in concentric relation with the drive shaft by tightening of the ring clamp.

The adjusting screw 8 is this way arranged to effect, in cooperation with the counter-support 19, a circumferential contraction of the ring clamp 7 such that a frictional engagement is achieved circumferentially about the drive shaft. In other words, the outermost end of ring clamp end 18 is stationary arrested near the radially outer periphery of the counter-support 19, while the angular relief 23, deviating from the radius of the base member 6, permits the knee 22 to move in the circumferential direction towards the other ring clamp end 17.

The ring clamp 7 may have a polygonal, or a round or a circular sectional profile. Optionally, the ring clamp 7 may be circular in section and formed to have a planar inner diameter, i.e. in a D-shaped sectional profile. The knee 22 and neighbouring portion of the ring clamp end 18 may likewise be formed in correspondence with the slanting angle of the frusto-conical portion 14, if appropriate.

FIG. 3 shows the assembly of the components as they appear when mounted in concentric relation about a drive shaft in a rotary machine. Albeit the drive shaft and rotary machine are not illustrated in FIG. 3 it will be understood that the seal member 1 with end face 2, in mounted position on the drive shaft, is forced by the compressed spring 5 to effect a sealed interface in cooperation with a sealing surface arranged stationary in the rotary machine housing. In the illustrated embodiment, the elastomer seal 3 comprises a top cylinder portion connecting to a bottom cylinder portion via an interconnecting radial portion 3'. Under the force of the spring 5, the radial portion 3' is compressed between the bottom end of seal member 1 and a radial flange 24 which is formed on the carrier 4. In result of its compression, the elastomer seal 3 expands radially inwards to effect sealing about the periphery of the drive shaft, as illustrated through the bulging at 25 in FIG. 3.

However, the detailed structures of the sealing elements are not critical for the operation, technical effect and achievable benefits of the present invention. The detailed explanation of the elastomer seal 3 is thus only for purpose of explaining the illustrated embodiment, and the combination of seal member 1 and elastomer seal 3 may be generally regarded as a sealing member comprised in an axial face seal assembly according to the present invention.

FIG. 3 illustrates the assembled components in temporary interaction with the mounting fixture 9. The fixture 9, see also FIG. 1, comprises a body having a top end and a bottom end. A central through-hole 26 mouthing in both ends of the body is adapted for insertion of the fixture on a drive shaft. The top end of the fixture body is adapted for assembling the seal assembly components in consecutive order on the top end of fixture 9. Projections 27 rising from the top end ensures a correct location of the seal assembly on the fixture 9. When the seal assembly is located correctly on the fixture 9, the adjusting screw 8 is aligned with an additional hole 28 through the fixture body. The additional through-hole 28 provides a passage for insertion of a tightening tool by which the adjusting screw 8 can be turned in order to tighten the ring clamp about the drive shaft.

The fixture 9 is further arranged to effect a predetermined compression of the compression spring 5 in the mounting procedure. When the seal assembly is located correctly on the fixture, the bottom end of the base member 6 rests on a circumferential shoulder 29 formed in the top end of the fixture 9. In this position the projections 27 are located in opposite relation to the dowels 10. The dowels are thus supported from the top ends of the projections 27, whereby the axial lengths of the dowels and projections cooperate in setting a predetermined axial distance between the carrier 4 and the base member 6. The compression spring 5, which is captured between a radial flange 30 formed on the carrier and a radial flange 31 formed on the base member, will be compressed correspondingly to apply a biasing force at the sealing interface between the rotating seal member 1 and the stationary seal surface arranged on the machine housing.

The seal assembly and fixture 9 are together insertable on the drive shaft in the form of a package. In the combined condition, the fixture 9 secures the ring clamp 7 in the bottom end of the base member 6. To this purpose, a shoulder 36 (see also FIG. 1) formed in the top end of the fixture supports the ring clamp when the seal assembly is located on the fixture. The shoulder 36 may be circular as disclosed, but need not be extended for a full circle.

Advantageously, the fixture and the seal assembly are temporary locked together in the combined or package condition. To this purpose, the tool passage 28 through the fixture 9 is dimensioned for mounting the fixture to the base member 6 under form fit or snap fit engagement with a head of the adjusting screw 8, the way this is illustrated in FIG. 3, e.g. The fixture, the ring clamp and the base member can this way be handled as one unit until the adjusting screw is tightened by screwing further into the base member, whereupon the form/snap fit engagement is broken and the fixture falls down from the seal assembly, which is then secured to the drive shaft.

The form fit or snap fit engagement can be dimensioned and tuned to provide the installer a positive indication, by the broken engagement between fixture and adjusting screw, that the seal assembly is now correctly secured axially and non-rotatably on the drive shaft. The fixture 9 is advantageously produced from a synthetic material and may be arranged to require a degree of deformation in order to break a form fit or a snap fit engagement with the adjusting screw 8.

The procedure of mounting the axial face seal assembly by assistance from the mounting fixture 9 is accomplished through the steps of:

assembling the seal assembly components in the top end of the fixture 9 which is arranged for locating in consecutive order the base member 6 with ring clamp 7 and tightening means 8, the compression spring 5, the carrier 4, and the seal members 3 and 1;

inserting the fixture and seal assembly together on the drive shaft until the seal member 1 abuts an opposite seal surface arranged stationary on the rotary machine;

compressing the seal assembly against the force of the compression spring 5 to a predetermined extent which is set by the fixture 9, and tightening the ring clamp before removing the fixture.

FEASIBLE MODIFICATIONS AND ALTERNATIVE EMBODIMENTS

FIGS. 1-3 illustrate one embodiment of the axial face seal assembly, wherein the dowels 10 and projections 27 are dimensioned for insertion from opposite directions to meet in supporting contact within the dowel-holes 11 through the base member 6.

The dowels may alternatively be extended to reach all through the dowel-holes 11. In such embodiment the projections 27 can be made shorter and need not be shaped for insertion into the dowel-holes 11. In yet an alternative embodiment the dowels may extend to be received in corresponding recesses formed in the top side of the base member, if appropriate.

In view of providing a simplified handling of the seal assembly, the dowels 10 are advantageously shaped to lock the carrier 4 and base member 6 in assembled relation when the dowels are inserted in the dowel-holes 11. To this purpose, the top end mouths of the dowel-holes 11 and the bottom ends of the dowels 10 may be dimensioned to prevent in cooperation the dowels from leaving the dowel-holes, but for a separating force that exceeds the force applied from the compressed spring 5 in the assembled condition. Alternatively, and illustrated in FIG. 4, the bottom ends of dowels 10' may be formed with tongues 32 which can be deformed in order to widen the dowel end, whereas the dowel-holes 11 are formed with a slight taper towards the top end, this way preventing the dowels 10' from leaving the dowel-holes.

As disclosed, the adjusting screw 8 is formed with a frusto-conical portion engaging directly the ring clamp 7 in the illustrated embodiment. Alternatively, the adjusting screw may be irregular in a sectional view, such as being formed with a radially protruding cam surface that engages the end of the ring clamp. In such embodiment, the adjusting screw needs turning only for a part of a full revolution in order to effect tightening of the ring clamp.

An adjusting screw may alternatively be arranged to effect tightening of the ring clamp through an indirect engagement via an interposed element arranged for guided movement on the base member. One such modified embodiment foresees that a sleeve having a conical outer surface is rotatably supported on the adjustment screw.

Another modification to the tightening means includes the provision of a separate clamp which is engaged by the adjusting screw and driven by the same to move towards the base member in order to tighten the ring clamp 7. The separate clamp may be L-shaped and formed with a slanting inner surface engaging a movable end of the ring clamp. Alternatively, the separate clamp 33 may be C-shaped as illustrated in FIG. 5, and formed with two opposite slanting inner surfaces 34, 35 each engaging one of two ring clamp ends 17, 18, both of which are arranged movable in the base member 6.

As will be understood from the above description of embodiments, the ring clamp 7 is advantageously tightened about the drive shaft through an operation wherein counter support for the force that is applied in tightening is supplied from the base member 6. Thus, in contrary to a separate retaining clamp which is conventionally tightened by means of a radial adjusting screw connecting the ends of the clamp, the ring clamp 7 rely on its engagement with the base member for the tightening operation.

Alternatively, the first and second ends of ring clamp 7 may each be engaged by a respective one of two adjusting screws, which are both rotatably journalled in the base member. The two adjusting screws may be equally threaded, or may be threaded in mutually opposite directions.

In yet another modification the open ring clamp may be arranged to have overlapping ring clamp ends. It is also conceivable that the ring clamp extends helically in one, one and a half, or in several complete revolutions, whereby one end of the ring clamp may be stationary seated in the base member and the other end movable so as to be engaged by a tightening means which is rotatably journalled in the base member. It is further conceivable that a ring clamp is separated into two ring clamp halves, each ring clamp portion reaching about half the circumference about the drive shaft and each ring clamp portion having at least one movable end engaging a separate tightening means.

Beside the modifications already mentioned, the appended claims shall be read to encompass any modification in detail of the seal assembly components that will be readily appreciable by the skilled person when applying the teachings provided herein.

The invention claimed is:

1. An axial face seal assembly, arranged for co-rotation with a drive shaft in a rotary machine, the seal assembly comprising:
   a seal member, a carrier, and a base member, all of which are shaped for mounting in concentric relation with the drive shaft,
   wherein the seal member is seated in the carrier to present a sealing end face, the carrier non-rotatably connected to the base member but movable axially with respect to the base member and biased from the base member by means of a compression spring interposed between the base member and the carrier, the base member axially and non-rotatably securable to the drive shaft by means of an open ring clamp having first end second ends,
   wherein the ring clamp is supported on the base member, at least one of the first and second ends movable relative to the other end in a circumferential direction of the ring clamp, and
   wherein a tightening means is rotatably journalled in the base member for adjusting a relative distance between the first and second ends of the ring clamp.

2. The seal assembly of claim 1, wherein the tightening means is arranged in a bottom end of the base member, opposite from a top end thereof facing towards the carrier.

3. The seal assembly of claim 2, wherein the ring clamp is supported near an inner periphery of the bottom end of the base member, the first end of the ring clamp firmly seated in a clamp seat formed in the bottom end of the base member, and the second end of the ring clamp located in a neighbouring clamp seat and movable in the circumferential direction by the tightening means engaging the second end of the ring clamp in the neighbouring clamp seat.

4. The seal assembly of claim 1, wherein the tightening means comprises an adjusting screw that is accessible for adjustment in a direction parallel with a longitudinal axis of the seal assembly.

5. The seal assembly of claim 4, wherein the adjusting screw comprises a frusto-conical portion, the end of which having the greater radius facing from the base member, the frusto-conical portion engaging an inner side of a knee connecting a circular portion of the ring clamp to the adjoining ring clamp end which is turning about the frusto-conical portion of the adjusting screw.

6. The seal assembly of claim 5, wherein the frusto-conical portion is a separate conical sleeve which is rotatably journalled on the adjusting screw.

7. The seal assembly of claim 2, wherein the tightening means comprises an adjusting screw indirectly engaging the first and second ends of the ring clamp via a C-shaped clamp driven by the adjusting screw for a guided movement in the base member.

8. The seal assembly of claim 1, wherein the carrier is non-rotatably connectable to the base member by means of at least one dowel projecting from a bottom end of the carrier for insertion into a corresponding dowel-hole mouthing in both ends of the base member.

9. A method for mounting the axial face seal assembly of claim 8 in co-rotating relation with a drive shaft in a rotary machine, comprising the steps of:
   assembling the seal assembly on a fixture arranged for locating in consecutive order the base member with the ring clamp and the tightening means, the compression spring, the carrier, and the seal member;
   inserting the fixture and seal assembly together on the drive shaft until the seal member abuts an opposite seal surface arranged stationary on the rotary machine;
   compressing the seal assembly against the force of the compression spring to a predetermined extent which is set by the fixture, and
   tightening the tightening means before removing the fixture.

10. A fixture arranged for mounting the axial face seal assembly of claim 8 in co-rotating relation with a drive shaft in a rotary machine, the fixture comprising:
    a body having top and bottom ends and a first through-hole, the radius of which is adapted for insertion of the fixture onto the drive shaft;
    the top end arranged for locating the seal assembly on the fixture;
    a second through-hole aligned with the tightening means when the seal assembly is located on the fixture, the second through-hole adapted for insertion of a tightening tool from the bottom end of the fixture body,
    wherein the top end of the fixture body is arranged to support in mutual relation the base member and the carrier at a predetermined axial distance.

11. The fixture of claim 10, wherein the fixture has a projection rising from the top end of the fixture body in opposite relation to the dowel projecting from the bottom end of the carrier, said projection supporting the carrier at an axial distance from the base member when the seal assembly is located on the fixture, axial lengths of the projection and the dowel in cooperation determining said axial distance.

12. The fixture of claim 11, wherein said projection in the top end of the fixture body is a dowel projecting into the dowel-hole through the base member when the seal assembly is located on the fixture.

* * * * *

UNITED STATES PATENT AND TRADEMARK OFFICE
CERTIFICATE OF CORRECTION

PATENT NO.      : 8,523,187 B2                         Page 1 of 1
APPLICATION NO. : 12/921837
DATED           : September 3, 2013
INVENTOR(S)     : Sivert Eriksson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this

Fifteenth Day of September, 2015

Michelle K. Lee
*Director of the United States Patent and Trademark Office*